(No Model.)
M. HOYT.
TIRE HEATER.
No. 323,686. Patented Aug. 4, 1885.
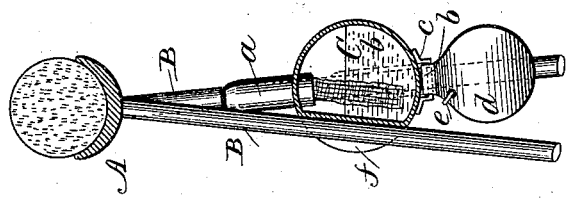
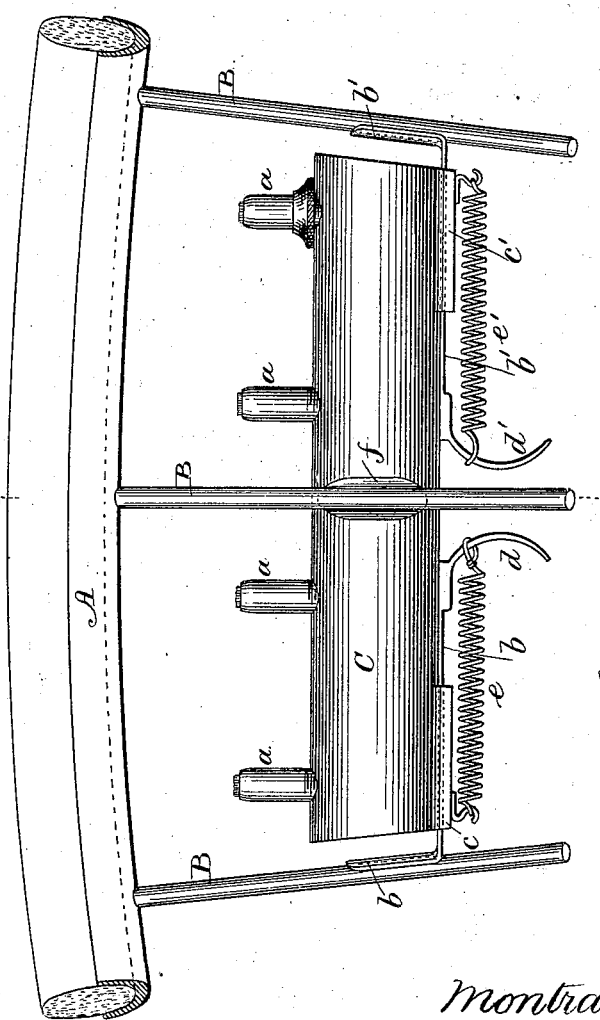
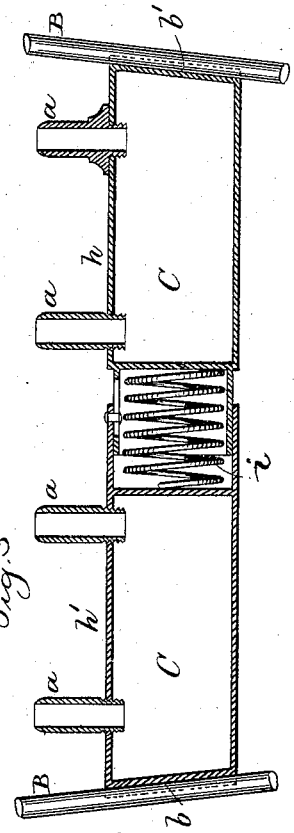
Witnesses
Chas H Smith
Harold Serrell
Inventor
Montraville Hoyt.
per Lemuel W Serrell
atty

UNITED STATES PATENT OFFICE.

MONTRAVILLE HOYT, OF JAMAICA, NEW YORK.

TIRE-HEATER.

SPECIFICATION forming part of Letters Patent No. 323,686, dated August 4, 1885.

Application filed June 20, 1885. (No model.)

*To all whom it may concern:*

Be it known that I, MONTRAVILLE HOYT, of Jamaica, in the county of Queens and State of New York, have invented a new and useful Improvement in Heaters for Cementing Rubber Tires; and the following is declared to be a description of the same.

My present invention is designed as an improvement upon the device described and claimed in an application for Letters Patent filed by me October 31, 1884, Serial No. 146,902; and, like the device described in aforesaid application, my present invention relates to a portable heating-lamp for cementing rubber tires upon the wheels of bicycles and tricycles or other vehicles.

My improved portable heating-lamp consists of a reservoir for the burning-fluid, burners upon said reservoir, and springs connected to said reservoir, by the pressure of which the heating-lamp can be held under the felly, and supported by and between the spokes of the wheel the rubber tire of which is to be cemented; and this lamp can be readily applied and held by and between the spokes and below the place to be heated, and there is no portion of the lamp or its supports that will interfere with lifting out the tire or other work to be done in cementing.

In the drawings, Figure 1 is an elevation of my improved heater as held in position between the spokes of a wheel. Fig. 2 is a section at $x$ $x$, Fig. 1. Fig. 3 is a view of said heater, the spring being placed between portions of the reservoir and acting to hold the same between the spokes.

A represents the felly of the wheel, and B the spokes; C, the reservoir for the burning-fluid, (preferably alcohol,) and upon said reservoir there are burner-tubes $a$, provided with wicks and caps, as usual, and I prefer to make one or more of said wick-tubes removable for the purpose of filling the reservoir with the burning-fluid. I employ grooved clamps $b$ $b'$ with the reservoir C, said clamps being adapted to receive the spokes, and there is a spring or springs to hold the clamps $b$ $b'$ against the spokes and retain the reservoir in place between the spokes of the wheel underneath the felly while the cementing process is progressing.

The grooved clamps $b$ $b'$ may be formed in or upon the ends of the reservoir C, as in Fig. 3, in which case the spring $i$ will be placed in the central part of the reservoir within the tubular ends of the portions $h$ $h'$, to press these outwardly; but I prefer to make the reservoir in one piece, and to support the clamps $b$ $b'$ by rods that slide in guides $c$ $c'$ upon the reservoir, and are operated by finger-pieces $d$ $d'$ and springs $e$ $e'$, as shown in Figs. 1 and 2. There is a depression in the side of the cylindrical reservoir at $f$, and into this the intermediate spoke shown is received. The reservoir, however, could be so positioned that this depression could be dispensed with.

To remove the heater or to place the same in position between the spokes it is only necessary to apply a sufficient pressure to overcome the springs and to remove the clamps from contact with the spokes.

Gas may be employed in place of burning-fluid by connecting tubing to the cylinder or reservoir.

I claim as my invention—

1. A heater for cementing rubber tires, composed of a reservoir for a burning-fluid—such as alcohol—burners upon such reservoir, and grooved clamps and a spring or springs, by which said reservoir is supported by and between the spokes of the wheel under the felly thereof, substantially as set forth.

2. The combination, with the reservoir C and burners $a$, of the clamps $b$ $b'$, the guides $c$ $c'$, finger-pieces $d$ $d'$, and springs $e$ $e'$, substantially as specified.

3. The combination, with the reservoir and burners, of grooved clamps engaging the spokes of the wheel, and by which the reservoir is held in place, substantially as specified.

Signed by me this 15th day of June, A. D. 1885.

M. HOYT.

Witnesses:
 GEO. T. PINCKNEY,
 HAROLD SERRELL.